(12) United States Patent
Wilson et al.

(10) Patent No.: US 8,401,756 B2
(45) Date of Patent: Mar. 19, 2013

(54) METHOD AND APPARATUS FOR CLUTCH PRESSURE CONTROL

(75) Inventors: Thomas H. Wilson, Indianapolis, IN (US); Charles F. Long, Pittsboro, IN (US); Travis A. Brown, Mooresville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/280,765

(22) Filed: Oct. 25, 2011

(65) Prior Publication Data

US 2012/0041654 A1 Feb. 16, 2012

Related U.S. Application Data

(63) Continuation of application No. 12/423,239, filed on Apr. 14, 2009, now Pat. No. 8,050,835.

(60) Provisional application No. 61/049,636, filed on May 1, 2008, provisional application No. 61/050,842, filed on May 6, 2008.

(51) Int. Cl.
*G03G 7/00* (2006.01)
(52) U.S. Cl. ............. 701/68; 701/67; 477/116; 477/127
(58) Field of Classification Search .................. 701/58, 701/59, 67, 68; 477/116, 127
See application file for complete search history.

(56) References Cited

U.S. PATENT DOCUMENTS

| | | | |
|---|---|---|---|
| 4,070,927 A | 1/1978 | Polak | |
| 4,827,806 A | 5/1989 | Long et al. | |
| 4,917,140 A | 4/1990 | King et al. | |
| 5,029,493 A * | 7/1991 | Takada et al. | 477/156 |
| 5,319,949 A | 6/1994 | Long et al. | |
| 5,601,506 A | 2/1997 | Long et al. | |
| 5,616,093 A | 4/1997 | Long et al. | |
| 6,382,248 B1 | 5/2002 | Long et al. | |
| 7,140,993 B2 | 11/2006 | Long et al. | |
| 7,150,288 B2 | 12/2006 | Long et al. | |
| 7,285,066 B2 | 10/2007 | Long et al. | |
| 7,288,039 B2 | 10/2007 | Foster et al. | |
| 8,151,620 B2 * | 4/2012 | Wilson | 73/1.63 |
| 2003/0114261 A1 | 6/2003 | Moorman et al. | |
| 2006/0246794 A1 | 11/2006 | Foster et al. | |
| 2007/0049442 A1 | 3/2007 | Long et al. | |
| 2007/0167285 A1 | 7/2007 | Long et al. | |
| 2007/0275823 A1* | 11/2007 | Motosugi et al. | 477/176 |
| 2009/0281698 A1* | 11/2009 | Wilson | 701/55 |

* cited by examiner

*Primary Examiner* — Patrick Cicchino
(74) *Attorney, Agent, or Firm* — Barnes & Thornburg LLP

(57) ABSTRACT

A method, apparatus and system for controlling transmission clutch system output pressures is provided. A transmission control unit and a pressure control device including an electro-hydraulic valve and a pressure switch cooperate to provide self-calibrating clutch pressure control systems.

15 Claims, 11 Drawing Sheets

METHOD AND APPARATUS FOR CLUTCH PRESSURE CONTROL

CROSS-REFERENCES TO RELATED APPLICATIONS

This application claims priority to and is a continuation of U.S. patent application Ser. No. 12/423,239, which claims priority to and the benefit of U.S. Provisional Patent Application Ser. No. 61/049,636, filed May 1, 2008, and claims priority to and the benefit of U.S. Provisional Patent Application Ser. No. 61/050,842, filed May 6, 2008, all of which are hereby incorporated herein by reference in their entirety.

BACKGROUND

Friction devices, such as clutches and brakes, of an automatic transmission of a vehicle are selectively engageable and disengageable to change gear ratios or alter the speed of the vehicle. For example, to shift from one transmission gear ratio to another, one clutch is disengaged and another clutch is engaged.

Electro-hydraulic valves are often used in automatic transmissions to control engagement and disengagement of friction devices, including transmission clutches. To achieve an acceptable shift quality, i.e., smoothly disengaging the off-going clutch and smoothly engaging the on-coming clutch, a typical automatic transmission electro-hydraulic valve must output a desired clutch pressure.

Electro-hydraulic valves used in automatic transmission clutch trim systems are available in many types, including variable bleed solenoids and related devices. In general, all of these devices receive an electrical input from electrical circuitry, such as an electronic or electrical controller, and provide an amount of output pressure that is a function of the amount of electrical input. Normally, the electrical input is electrical current. The relationship between the output pressure and the electrical input is defined by a transfer function.

The solenoid transfer function often varies from valve to valve even among valves of the same type. Solenoid valve manufacturers are therefore often challenged to minimize valve-to-valve variations in the command-to-output transfer function. During manufacture, valves are typically adjusted at their "end of line" test to keep the transfer function characteristic curve within specified limits. Such adjustments shift or offset the characteristic curve along the electrical input axis but do not significantly alter the overall curve shape or slope.

While the offset adjustment is helpful in reducing valve-to-valve variations, valve rejects still exist and add to production costs. Even "good" valves still retain some detrimental part-to-part variation within their specified limits.

Additionally, existing solenoid calibration systems require individual solenoid characterization data to be captured during solenoid manufacture and then loaded into the on-board transmission controller during transmission manufacture. Such systems are not usable after transmission manufacture; for example, when individual solenoids may need to be replaced in a service environment.

SUMMARY

According to one aspect of the present invention, methods for controlling a transmission clutch pressure are provided. In one embodiment, a method for calibrating a clutch pressure control system of an automatic transmission of a vehicle is provided. The method includes obtaining at least one reference output pressure value and at least one reference electrical input value related to the reference output pressure value for a pressure control device in an operating range of an automatic transmission of a vehicle, actuating a pressure switch coupled to the pressure control device to obtain an actual electrical input value corresponding to the reference output pressure value, calculating an offset between the reference electrical input and the actual electrical input, and applying the offset to the at least one reference electrical input value.

The obtaining step may include obtaining a plurality of reference pressure values in an operating range and a plurality of reference electrical input values related to the reference pressure values in the operating range, and the applying step may include selectively applying the offset to only certain of the reference electrical input values in the operating range.

The applying step may include selectively applying no offset to at least one reference electrical input value in a first portion of the operating range. The applying step may include selectively applying the full offset to at least one reference electrical input value in a second portion of the operating range different than the first portion of the operating range. Also, the applying step may include selectively applying a proportional offset to at least one reference electrical input value in a third portion of the operating range different than the first and second portions of the operating range. The first portion of the operating range may be above an upper reference output pressure value. The second portion of the operating range may be below a lower reference output pressure value. The third portion of the operating range may be between the upper reference output pressure value and the lower reference output pressure value.

The obtaining step may include obtaining a first reference output pressure value located near an upper end of an operating range and at least one reference electrical input value related to the first reference output pressure value, obtaining a second reference output pressure value located near a lower end of an operating range and at least one reference electrical input value related to the second reference output pressure value, the actuating step may include actuating the pressure switch in a first position to obtain a first actual electrical input value corresponding to the first reference output pressure value and actuating the pressure switch in a second position to obtain a second actual electrical input value corresponding to the second reference output pressure value, the calculating step may include calculating a first offset between the first reference electrical input and the first actual electrical input and calculating a second offset between the second reference electrical input and the second actual electrical input, and the applying step may include applying the first and second offsets to the at least one reference electrical input value.

The method may be repeated at a plurality of different operating temperatures of the pressure control device. The obtaining an actual electrical input may include receiving at a controller an electrical signal from the pressure switch. The method may include storing the at least one reference electrical input values in a computer-readable medium coupled to a transmission control module.

According to another aspect of the present invention, an apparatus for controlling a transmission clutch pressure is provided, including a hydraulic fluid supply, an electro-hydraulic pressure control valve coupled to the hydraulic fluid supply, a pressure switch coupled to the electro-hydraulic pressure control valve, and a controller configured to send electrical inputs to the electro-hydraulic pressure control valve, monitor the pressure switch, compare at least one selected electrical input to at least one reference electrical input, and selectively modify the at least one reference electrical input.

The electro-hydraulic pressure control valve may include a solenoid and a pressure control valve coupled to the solenoid. The pressure control valve may include an axially translatable spool, a first land, a second land longitudinally spaced from the first land to define a first fluid chamber therebetween, and a return spring. The pressure switch may be in fluid communication with the first fluid chamber, and the return spring may be configured to prevent spool movement until a desired solenoid pressure is attained.

The spool may be configured to move when the desired solenoid pressure is attained, movement of the spool may actuate the pressure switch, and actuation of the pressure switch may signal the controller to record the amount of electrical input required to achieve the desired pressure.

The pressure control valve may include a third land spaced between the return spring and the second land. The third land may have a differential area. The differential area may be configured to receive control pressure applied thereto, such that when control pressure is applied to the differential area of the third land, the return spring and the differential area cooperate to bias the valve in an "off" position.

The spool may be configured to move from the biased position when a second desired solenoid pressure is attained. Movement of the spool may activate the pressure switch, and activation of the pressure switch may signal the controller to record a second amount of electrical input required to achieve the second desired pressure.

The spool may be configured to move when a desired solenoid pressure is attained. Movement of the spool may toggle the pressure switch between first state and a second state, and a change from the first state to the second state of the pressure switch may signal the controller to record the amount of electrical input required to achieve the desired pressure.

The reference electrical input and/or the selectively modified reference electrical input may be stored in a storage medium accessible by the controller, such as a look-up table, database, or similar data structure.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

Figure 1:
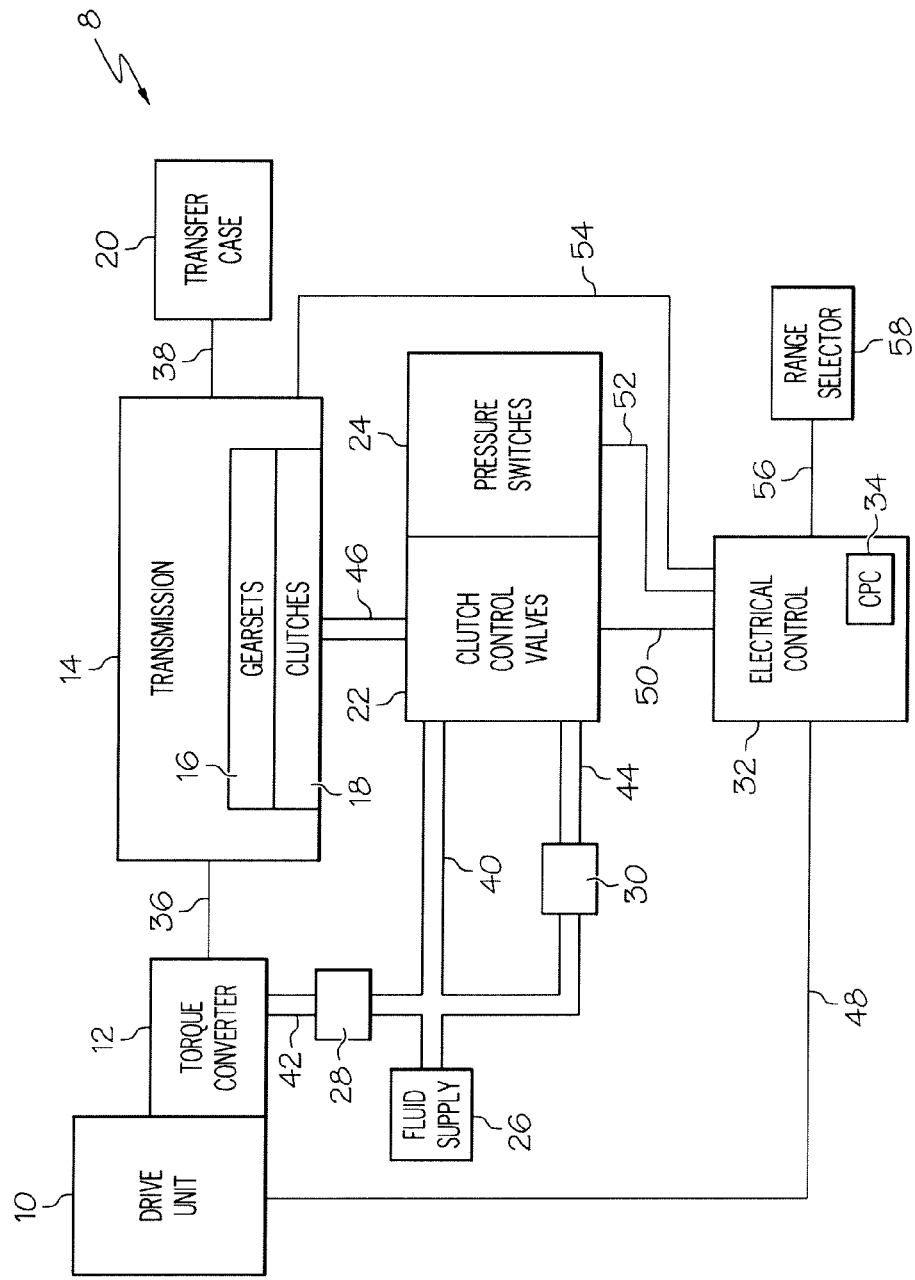
FIG. 1 is a block diagram of a driveline of a vehicle equipped with an automatic transmission and a clutch pressure control in accordance with the present invention.

In general, like structural elements on different figures refer to identical or functionally similar structural elements although reference numbers may be omitted from certain views of the drawings for simplicity.

DETAILED DESCRIPTION OF THE DRAWINGS

Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments.

Aspects of the present invention are directed to improving the ability of the transmission to compensate for variations in the solenoid valve transfer function from valve to valve. The illustrated embodiments are particularly directed to improving pressure control after installation of the solenoids in an automobile transmission assembly or other electro-hydraulic control system. Such methods may be conducted during transmission manufacture or assembly, or during operation of the transmission in real time. Such improvements may be expected to improve transmission shift quality by providing calibration during transmission operation, thereby increasing customer satisfaction. Such improvements may also lower the cost of the electro-hydraulic valves since a greater valve-to-valve variation can be tolerated.

Further, solenoid performance varies according to changes in the temperature of the transmission. The disclosed improvements may therefore result in improvements to temperature compensation tables when applied during operation of the transmission.

While the present invention is described herein in the context of an automatic transmission of a motor vehicle, it is also applicable to other electro-hydraulic control systems in which a first electro-hydraulic apparatus having a lower range of possible output pressures (such as a solenoid, which may have a pressure range of 0-100 psi) is used to control another hydraulic apparatus having a higher range of possible output pressures (such as a spool valve, which may have a pressure range of 0-300 psi).

Details of the present invention may be described herein with reference to either normally high solenoids, in which pressure is output when no electrical input is applied to the solenoid and no pressure is output when electrical input is applied to the solenoid, or normally low solenoids, in which pressure is output when electrical input is applied to the solenoid and no pressure is output when no electrical input is applied to the solenoid. It will be understood by those skilled in the art that the present invention may be used to control pressure in systems using either type of solenoid, by reversing the application of electrical input.

In the illustrated embodiments, pressure switches, hydraulic logic and solenoid current control are used in combination to calibrate solenoid performance and provide pressure control. A pressure switch is activated by movement of a spool valve to establish one or more measured performance points on the pressure-current (P/I) curve of the respective solenoid.

In one embodiment, a clutch pressure control (CPC) 34 is provided in an electrical control 32 for an automatic transmission 14. Control 34 comprises computer programming instructions or logic executable to perform one or more of the methods described herein. A microprocessor or similar device of electrical control unit 32 is configured to access and execute control 34.

In general, control unit 32 controls operation of transmission 14 based on inputs from drive unit 10, torque converter 12, transmission 14, range selector 58, and/or other inputs. Such inputs may include electrical and/or analog signals received from sensors, controls or other like devices associated with the vehicle components. For instance, inputs may include signals indicative of transmission input speed, driver requested torque, engine output torque, engine speed, temperature of the hydraulic fluid, transmission output speed, turbine speed, brake position, gear ratio, torque converter slip, and/or other measurable parameters.

Electrical control 32 generally includes electrical circuitry configured to process, analyze or evaluate one or more inputs and issue electrical control signals as needed through one or more electrical lines or conductors. Such connections may include hard-wired and/or networked components in any suitable configuration including, for example, insulated wiring and/or wireless transmission as may be appropriate or desired.

Electrical circuitry of control 32 includes computer circuitry such as one or more microprocessors and related elements configured to process executable instructions expressed in computer programming code or logic, which is stored in one or more tangible media, i.e., any suitable form of memory or storage media that is accessible or readable by the processor or processors. Control 32 may also include analog to digital converters and/or other signal processing circuitry or devices as needed to process one or more of the inputs received from the vehicle components.

While shown schematically as a single block 32, it will be understood by those skilled in the art that portions of control 32 may be implemented as separate logical or physical structures. For example, control 34 may be physically and/or logically separated from electronic controls for transmission 14 or electronic controls for drive unit 10. All or portions of control 34 may alternatively or in addition be executed by a controller that is not on-board the transmission, such as an external controller located at the transmission manufacturer or assembly location but is connectable to the transmission.

Electrical control 32 is in communication with drive unit 10 via one or more links 48, with clutch control valves 22 via one or more links 50, with pressure switches 24 via one or more links 52, with transmission 14 via one or more links 54, and with a range selector 58 via one or more links 56.

Drive unit 10 includes an internal combustion engine, such as a spark-ignited engine or diesel engine, an engine-electric motor combination, or the like. Drive unit 10 is coupled to transmission 14 by a transmission input shaft 36. A fluidic torque converter 12 is generally interposed between drive unit 10 and transmission 14 to selectively establish a mechanical coupling. Transmission 14 is coupled to the vehicle drive wheels via an output shaft 38 in one of several conventional ways. A transfer case 20 may be shiftable to select one of several drive conditions, including various combination s of two-wheel drive and four-wheel drive, high or low speed ranges, and the like.

Transmission 14 is an automatic transmission. Transmission 14 may include a gear assembly of the type described in U.S. Pat. No. 4,070,927 to Polak or another type, and may have an electro-hydraulic control of the type described in U.S. Patent Application Publication No. 2003/0114261 to Moorman, et al. or in U.S. Pat. No. 5,601,506 to Long, et al. or another type. Transmission 14 is shiftable to selectively establish one of several ranges including, for example, a neutral range, a reverse range, a drive range, and/or a plurality of manually selectable forward ranges.

The number of available forward ranges is determined by the configuration of the transmission gearsets 16 and clutches 18. For example, transmission 14 may have three interconnected planetary gearsets and five clutches which are controllable to provide six forward gears. Other configurations, such as an eight-speed configuration, may also be used.

Operation of clutches 18 is controlled by an electro-hydraulic control system including a plurality of control valves 22 and a supply of hydraulic fluid 26. In general, each valve 22 includes a solenoid, such as a variable bleed solenoid, on/off solenoid, or similar device. Fluid supply 26 is operable to supply hydraulic fluid to torque converter 12 via one or more passages or conduits 42 and to valves 22 via a plurality of passages or conduits 40, 44. Pressure regulator valves 28, 30 operate to regulate fluid pressure in lines 42, 44, respectively.

Control 32 sends electrical signals to control valves 22 via the one or more links 50, for example, in response to a shift request received from range selector 30. The electrical signals cause one or more of the control valves 22 to adjust fluid pressure or fluid flow direction in one or more of the fluid passages connecting valves 22 and clutches 18.

The amount of electrical input required by a valve 22 to achieve a desired output pressure is generally initially set according to the valve supplier's specifications, which are typically represented by pressure vs. electrical input (i. e., current) ("P/I") curves, charts or tables. According to the present invention, these electrical input requirements are modified or "fine-tuned" for each individual valve as the valve is actuated, through application of the disclosed methods.

In the illustrated embodiment, pressure switches 24 are operably coupled to control valves 22 to in effect render valves 22 self-calibrating in accordance with the methods described herein.

In one embodiment, control 32 includes a microprocessor-based controller 60 and CPC 34 includes a plurality of computer routines 62, 64, 66, 72, 74, 76, stored in computer memory or other computer-accessible storage medium and executable by controller 60. Pressure switches 68 send diagnostic signals to controller 60 for processing by the routines of CPC 34, and a transmission temperature sensor 70 sends signals indicative of the temperature of the transmission to controller 60 for analysis by routine 72. Controller 60 issues control signals to valves 78 as a result of executing routine 76.

Routine 62 includes clutch control logic configured to receive signals indicative of clutch commands or requests (i.e.

a request to shift from one gear to another) and determines which clutch to apply and which clutch to release in order to execute the shift command. Such clutch control logic generally includes pressure profile routines that are selectively established based on the requested or commanded shift. Each pressure profile routine includes a plurality of pressure values that are applied during the shift to smoothly engage and disengage the appropriate clutches. Different pressure profile may be established for different shifts, i.e. the pressure profile for a shift from first to second gear may be different than the pressure profile for a shift from third to fourth gear.

Routine 64 receives outputs from routine 62, i.e., a clutch indicator, such as a clutch numbers identifying the clutche(s) to be applied or released, for example, and determines the pressure profile required to accomplish the application or release of the appropriate clutches. Routine 72 determines the amount of electrical input (i.e., current) required to be sent to the clutch control valve 78 to achieve the clutch pressures required to execute the commanded or requested shift.

The amount of electrical input (i.e., current) required is a function of the clutch pressure required to accomplish the requested shift, the transmission temperature, the solenoid specifications, and other parameters that are not directly relevant to the present invention. In the illustrated embodiment, a look-up table is used to determine the required electrical input based on the required pressure value received from routine 64 and the temperature value received from sensor 70. The look-up table values are generally based on valve specification information provided by the control valve manufacturer and/or transmission manufacturer.

Routines 66 and 74 execute portions of one or more of the pressure control methods described herein to adjust the required electrical input value to account for valve-to-valve differences. Routine 76 then sends the adjusted electrical input (i.e., current) amount to the valve 78 and valve 78 produces the required output pressure to control the clutch. These routines execute one of a plurality of alternative methods for pressure control, including but not limited to one or more of the three methods described below.

These routines may also include programming logic and instructions to select one of the plurality of available methods based on the operating environment, for example, a different one of the described methods may be used if the calibration is being performed during transmission manufacture, during installation of the transmission in the vehicle, during operation of the transmission in a factory or testing environment, or during operation of the transmission in a production or commercial use situation. As such, programming instructions and logic to perform any or all three of the described methods may be included in CPC 34 and stored in memory or other suitable storage medium accessible by control 32, 60.

Figure 3:
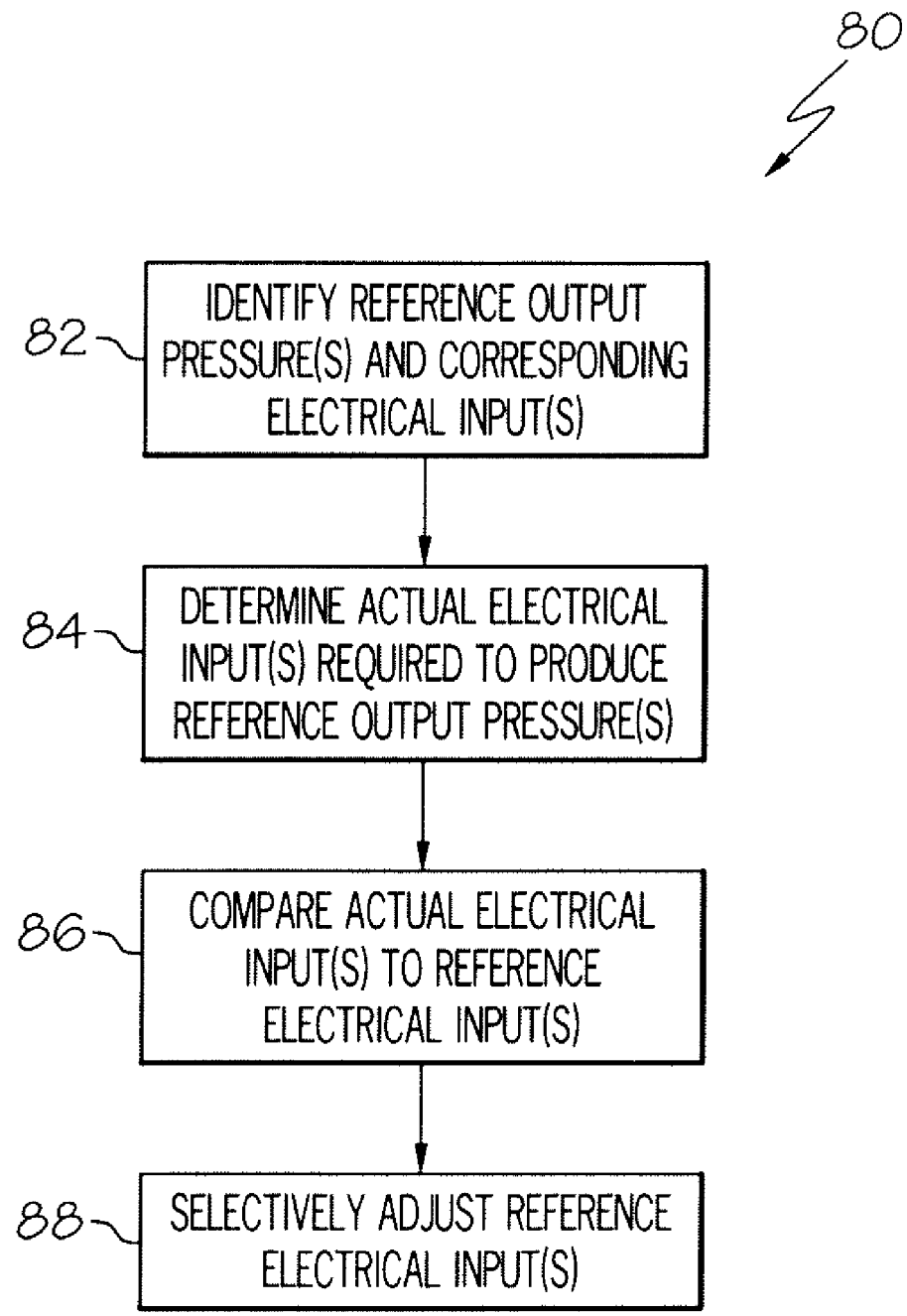
FIG. 3 is a flow chart of functional operations performable by a transmission controller or other control unit to control clutch pressure.

In one embodiment, routines 66 and/or 74 include programming logic or instructions to execute the steps shown in FIG. 3. Step 82 is executed to identify or specify one or more reference output pressures for the calibration control 34. The reference output pressure is the amount of pressure required to be output by a solenoid to actuate the pressure switch before a clutch is engaged or disengaged. At step 84, a plurality of sequenced electrical inputs are applied to the solenoid to determine the actual current required to actuate the switch (i.e., to determine the current required to achieve the reference pressure). The electrical inputs are ramped up until a response is received from the pressure switch.

Step 84 also includes measuring or determining the actual electrical input (i.e., current) required by the particular valve to produce the reference output pressure determined at step 82. Step 86 compares reference to actual current and determines the offset(s) between the actual measured electrical input and the pre-specified reference electrical input amount. Step 88 includes selectively adjusting the pre-specified reference electrical inputs based on the offset(s) determined by Step 86. In other words, the reference P/I curve for the solenoid is modified as a result of step 88. Such modifications may be done at selected points along the P/I curve or for points within particular ranges of pressures, according to one of the methods described herein. In this way, reference P/I curves may be customized or "custom fit" for the solenoids in the transmission system.

The first pressure control method may be referred to as the single (lower) point calibration method. The second method described herein may be referred to as the dual (lower and upper) point calibration method. The third method described herein may be referred to as the modified single point calibration method.

All three methods utilize a lower calibration point located (near) the lower end of the critical operating range of the transmission system. The first and second methods also use an upper calibration point located nearer the upper end of the critical operating range of the transmission system, however, in the first method, the upper calibration point is pre-specified so that the P/I curves for a solenoid or group of solenoids will pass through the upper calibration point. In other words, the first method effectively assumes that all solenoids in a supply have the same electrical input requirement at one selected pressure value (the upper calibration point) located near the upper end of the transmission operating range. The single point calibration method is thus particularly useful when the position or location of at least a portion of the individual solenoid's P/I curve along the electrical input ("x") axis is fairly close to the location of the reference P/I curve provided by the supplier. The shape of the solenoid's P/I curve (i.e., its slope profile along the pressure or "y" axis) may be inconsistent relative to the reference P/I curve.

The second method uses an upper calibration point, but does not require the individual solenoid P/I curves to intersect the reference P/I curve at that point. The dual point method may therefore enable use of solenoids with P/I curves that vary in position (location along the x axis) or curve shape (i.e., slope angle or contour) relative to the reference P/I curve. The slope angle or curve shape/contour is modified by both the first method and the second method.

The third method, or modified single point method does not require an upper calibration point at all. The third method is therefore particularly useful when the individual solenoid P/I curves have a curve shape (i.e., slope angle or contour) that is substantially consistent and similar to the reference P/I curve shape. All three methods utilize a specially configured valve assembly including a pressure switch, to detect the actual or measured electrical input values at the reference pressures. Details of each of the methods are described below.

Table 1 summarizes and compares aspects of the three pressure control methods. As can be seen from Table 1, the determination of which method may be most appropriate for a particular application depends at least in part on characteristics of the individual solenoid P/I curves relative to the reference P/I curve. These characteristics may be stipulated (specified to the solenoid supplier, for example) in advance, as when an order for a supply of solenoids is placed. Alternatively or in addition, these characteristics may be determined through calibration techniques after the solenoids are made or installed.

TABLE 1

|  | Single Point Method | Dual Point Method | Modified Single Point Method |
| --- | --- | --- | --- |
| Suitable for solenoids with inconsistent P/I curve . . . | shape/slope angle | shape/slope angle and location | location |
| Requires solenoid supplier to . . . | set P/I for one high pressure point | keep P/I within a wide tolerance band | keep P/I slope consistent |
| Requires in transmission measuring of . . . | lower performance point | lower & upper performance points | lower performance point |
| Requires pressurizing differential spool land? | no | yes | no |
| Offsets may be positive or negative? | yes | yes | yes |
| Low pressure offsets | same as lower point | same as lower point | same as lower point |
| Midrange pressure offsets | proportional | proportional | same as lower point |
| High pressure offsets | none | same as upper point | same as lower point |
| Can calibrate P/I at multiple temperatures? | yes | yes | yes |
| Switch transition identifies | lower point | upper and lower points | lower point |

As summarized in Table 1, each of the disclosed methods modifies the solenoid P/I curve by providing an offset in either direction (positive or negative) along the electrical input ("x") axis. Additionally, the single and dual point methods selectively modify the shape of the P/I curve. All three of the methods are usable at multiple operating temperatures.

Figure 2:
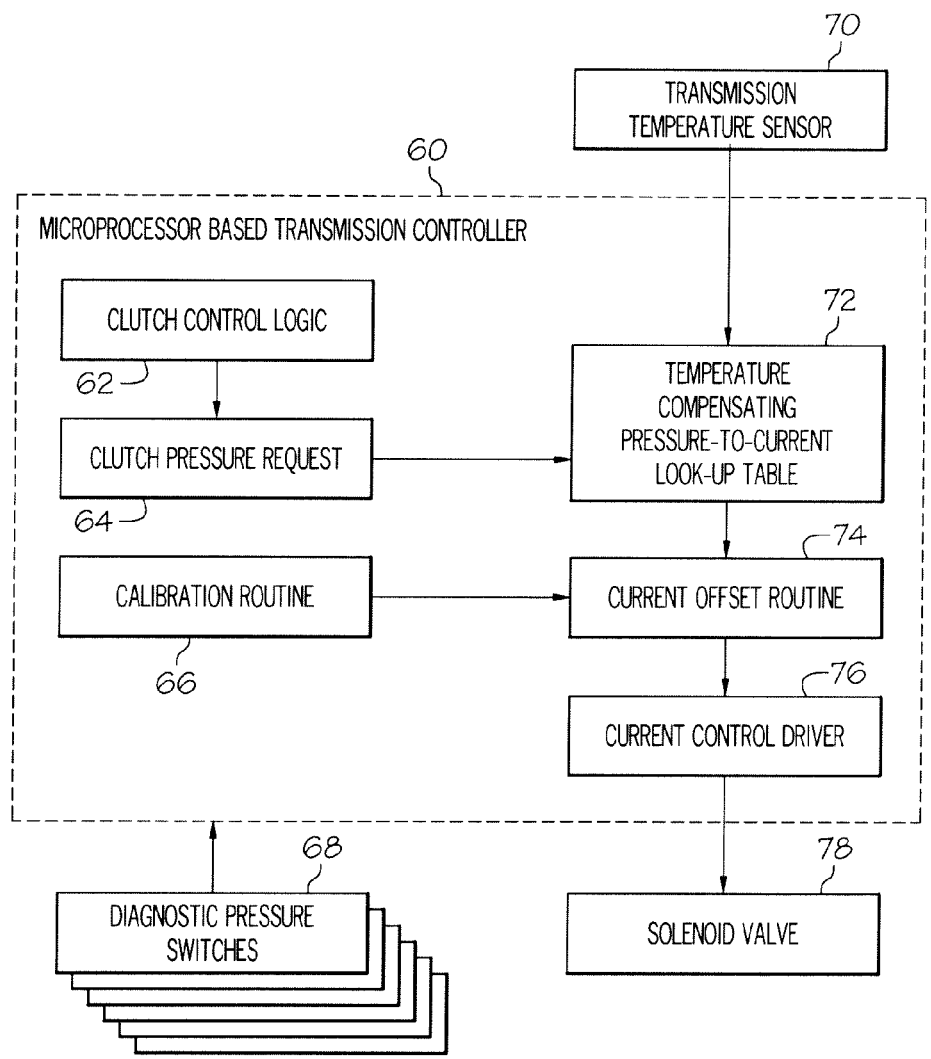
FIG. 2 is a flow chart illustrating functional routines of an automatic transmission clutch pressure control process executable by a transmission controller or other control unit.
Figure 4:
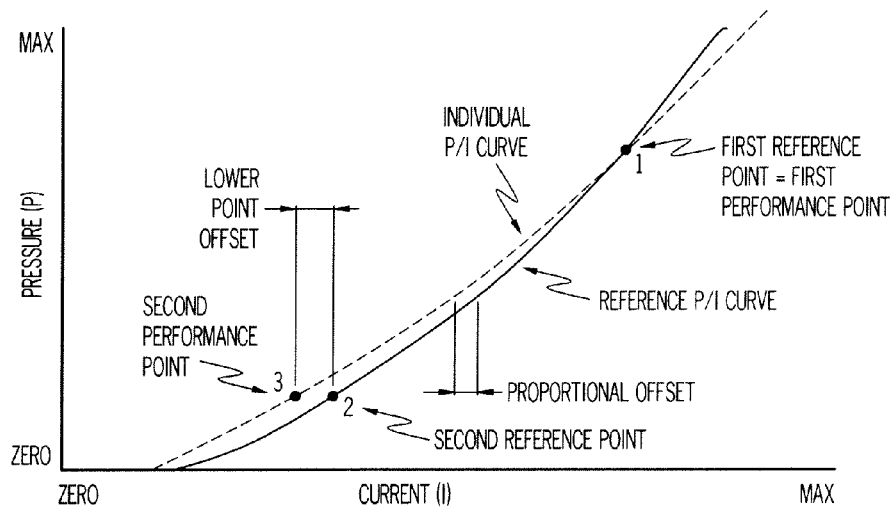
FIG. 4 is a graph illustrating aspects of a first, "single point" pressure control method.

The graph of FIG. 4 illustrates aspects of the first pressure control method, referred to herein as the single point method. In the embodiment of FIG. 2, routine 66 is configured to execute this method to control solenoid valve output pressure in an automatic transmission system of a motor vehicle. However, the method may also be used in other similar pressure control applications.

According to the single point method, solenoid performance specifications are provided that require the greatest P/I curve accuracy at a single pressure value near the upper end of the solenoid's critical operating range. In other words, point 1 is a pre-specified high calibration point at which all solenoids in a supply have the same output pressure. This upper calibration point is denoted as the first reference point (point 1) on FIG. 4. Because the offset is zero, the actual electrical input required to produce the reference output pressure is the same as the reference electrical input. In other words, point 1 is the first reference point and also the first performance point.

The pre-selected specifications are toleranced about the solid-line reference P/I curve of FIG. 4. The reference P/I curve is typically based on published specifications or other existing specifications for a particular model solenoid or family of solenoids; for example, those that may be provided by the valve manufacturer or supplier. The reference P/I curve may be selected or modified based upon previously performed iterations of one or more of the methods described herein or conventional solenoid calibration techniques. The reference P/I curve specifications are stored in memory in the form of a look-up table, database, or similar data structure and made available to the microprocessor or controller 32, 60 through execution of computer program instructions configured to access the data structure. The reference P/I curve is shown as a solid-line curve in the various figures.

In the illustrated embodiment, point 1 of FIG. 4 is the specified high calibration point. The solenoid manufacturer or supplier will adjust each solenoid to insure that the P/I curves of all solenoids pass through the high calibration point at a specified calibration temperature. Point 1 is selected to be near the upper end of the transmission's critical operating range. Allowable (specified) solenoid pressure error for any given current is smallest at point 1 (diminishing to near zero) and increases above and below point 1.

Once the upper calibration point and reference P/I curve are determined, then a second reference point is specified or selected. The second reference point is represented by point 2 of FIG. 4. In the illustrated embodiment, point 2 is on the reference P/I curve (solid line) and is located near the lower end of the transmission's critical operating range. Point 2 may be referred to as the "lower calibration point." Most individual solenoid P/I curves will actually pass to the left or right of this point as a result of manufacturing variation. Examples of individual solenoid P/I curves are shown by the dashed-line curves in the various figures.

Figure 6:
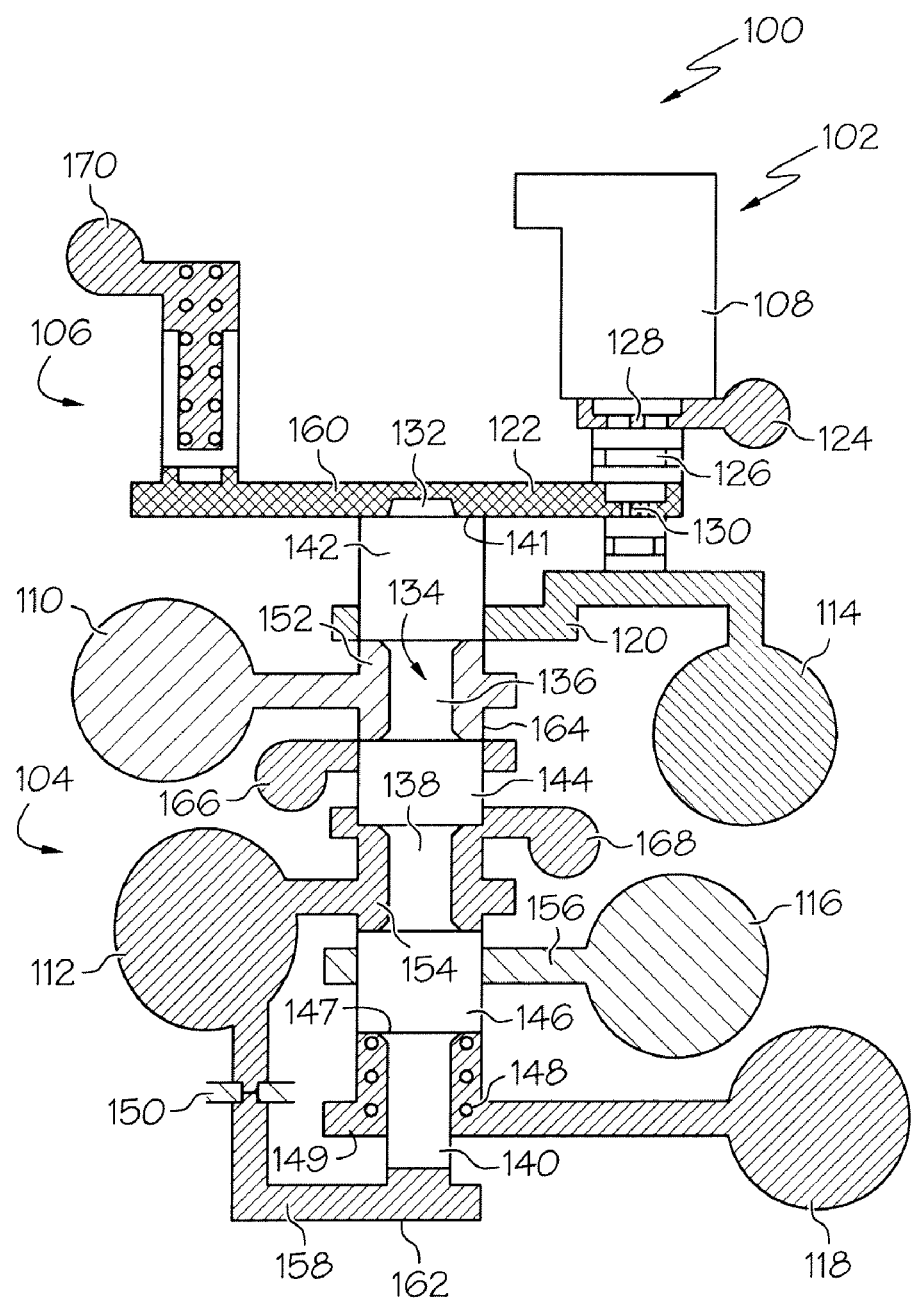
FIG. 6 is a schematic of a pressure control apparatus usable to execute steps of a single or dual point solenoid pressure control method, shown in a first characterization position.

A pressure control apparatus such as shown in FIG. 6, described below, is set to the first characterization position shown in FIG. 6 to determine the actual electrical input, i.e., current, required for the particular solenoid being evaluated to generate the reference output pressure (point 2) at the lower end of the solenoid's operating pressure range. This actual current is represented by point 3 of FIG. 4 and may be referred to herein as a "performance point." Point 3 is on the actual (dashed-line) P/I curve for an individual solenoid. Points 2 and 3 are at the same pressure but differ in solenoid drive current required to produce that pressure.

Point 3 of the first method is automatically established for each solenoid during transmission operation or factory test, using algorithms executed by routine 66 of FIG. 2 and the pressure control apparatus 100 set to the position shown in FIG. 6. The pressure control apparatus 100 is activated at a predetermined solenoid pressure by designing the spool valve assembly 104 and the return spring 148 to prevent spool movement until the desired solenoid pressure is reached. In the illustrated embodiment, porting of the spool valve assembly 104 changes the amount of pressure applied to switch 110 upon slight movement of the spool 134.

In all cases, pressure is removed from switch 110 when spool 134 moves. Movement of spool 134 may be caused by application of current or lack thereof, depending on the solenoid type.

When the switch 110 is actuated (i.e. current applied or removed, depending upon whether a normally high or normally low configuration is used), the transmission controller 32, 60 is signaled to record the unique current required to achieve that pressure. The process is repeated for each clutch control solenoid 22 in the system 8.

The actual measured current required by the solenoid 102 to produce the reference output pressure (performance point 3) is then compared to the previously determined reference current represented by point 2 on the reference P/I curve.

The current offset, i.e., the difference between the reference current recommended by the controller's reference P/I look-up table for the specified output pressure and the actual measured current performance point is calculated. The offset is then selectively applied to modify the controller's P/I lookup table 72 (effectively altering the shape of the reference P/I curve). In the single point method, the offset is applied proportionally over the range of pressures between the upper and lower reference points. No current offset is applied to pressure requests above this range. The offset is applied equally to all pressures below the lower calibration point (point 2 of FIG. 4). In this way, selective application of the offset creates a new or modified reference P/I curve having a different shape than the original reference P/I curve.

More specifically, routine 74 uses the measured difference between the reference current (pre-programmed into the controller) and the actual current performance point to modify the shape of the individual solenoid's reference P/I curve between points 1 and 2 of FIG. 4.

In operation of the transmission 14, microprocessor 60 will issue a pressure request, to respond to a shift request, for example. If microprocessor 60 requests the point 2 pressure, the full amount of the offset is added or subtracted from the point 2 reference current determined in the pressure-to-signal lookup routine 72. If microprocessor 60 requests a pressure at or above point 1, no offset is applied. If microprocessor 60 requests any pressure between points 1 and 2, the offset applied to the current is "prorated", or applied proportionally to the requested pressure. All pressure requests below point 2 receive the same (full) current offset as point 2, and all pressure requests above point 1 receive the same (zero) offset as point 1. Aspects of the single point method are summarized in the first column of Table 1 above.

It should be noted that in all of the methods, reference points and performance points are determined at the same solenoid temperature and may be determined at a variety of different temperatures. One of a variety of known techniques for applying temperature compensation to the solenoid may be executed by the temperature compensation routine 72, described above.

Prior art calibration methods have altered solenoid reference P/I curves by applying an offset in only one axis. Proportional application of the offset according to the present invention as described herein alters both the location and shape of the reference P/I curve to more closely match the individual solenoid's true P/I curve and thus compensate for variations that are impractical to control during solenoid manufacture.

Figure 5:
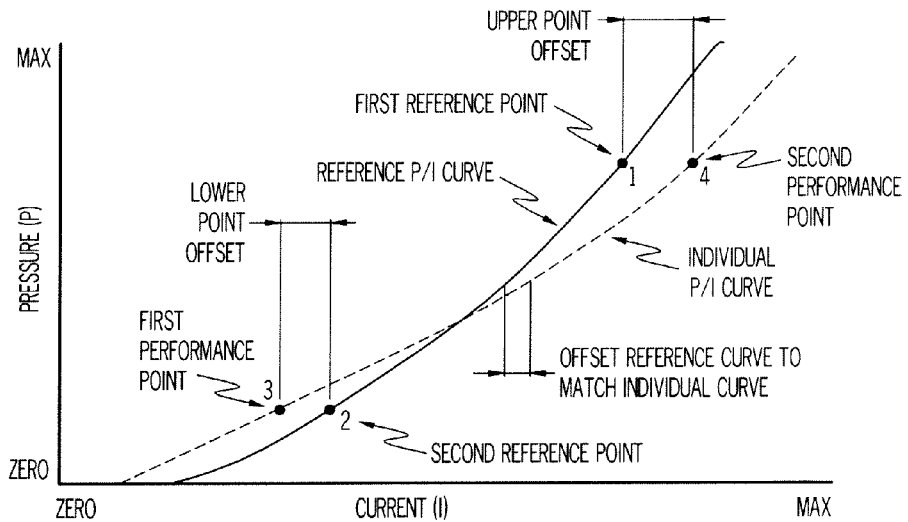
FIG. 5 is a graph illustrating aspects of a second, "dual point" pressure control method.

The graph of FIG. 5 illustrates aspects of the second pressure control method referred to herein as the dual point calibration method. Routine 66 is configured to execute this method to control solenoid valve output pressures in an automatic transmission of a motor vehicle, either in addition to or as an alternative to one or more of the other methods described herein. However, the method may also be used in other similar pressure control applications.

According to the dual point method, solenoid performance specifications are selected to allow "relaxed" (i.e., within a wide tolerance band) pressure limits over the full solenoid operating range. FIG. 5 shows an illustration of such specifications, wherein unlike in FIG. 4, the upper performance point (point 4) does not equal the upper reference point (point 1). As such, less precise, and thus less costly, solenoid models may be used for clutch control in the transmission.

According to the dual point method, the upper and lower reference points 1 and 2, and the reference P/I curve (solid-line) are predetermined and stored in a look-up table or similar structure. Pressure control apparatus 100 is used to determine the current required for each solenoid to generate two specific solenoid pressures: one near the lower end (point 3) and one near the upper end (point 4) of a transmission system critical operating pressure range. The lower point current offset is determined in the same way as in the first method, described above, and the lower point offset is applied to pressure requests below the lower point.

The upper point current offset is determined as described below and applied to pressure requests above the upper point. Both offsets are proportionally applied to pressure requests between the lower and upper calibration points. The shape of the P/I curve is thus modified accordingly. This process is automatically repeated at various operating temperatures to customize the controller's temperature compensation data for each clutch control solenoid in the transmission.

As shown in FIG. 5, use of the dual calibration point method should permit the solenoid manufacturer to supply solenoid units with wider P/I curve variations (the distance between the solid-line curve and the dashed-line curve) than was previously acceptable, because two reference or target points are used. The possibly wider P/I curve variation extends roughly equidistantly on either side of the initial reference P/I curve. As noted above, point 1 is on the controller's initial reference P/I curve and is selected to be near the upper end of the transmission's critical clutch control pressure range. In other words, point 1 is the same as the first reference point 1 described above. Point 2 is also on the reference curve but is located at the lower end of the pressure range. In other words, point 2 is the same as the second reference point 2 described above. Points 1 and 2 are determined by processor 32, 60 accessing a computerized lookup table or similar structure in which the values corresponding to the reference P/I curve are stored.

Points 3 and 4 of FIG. 5 represent actual current values determined using the pressure control apparatus 100 described below. Thus, points 3 and 4 lie on an individual solenoid's actual P/I curve (dashed line) and are located at the same respective pressures as points 2 and 1, respectively. Point 3 may be obtained automatically during transmission operation or factory test using the same method as in the lower point approach explained above (i.e., using the first characterization position of FIG. 6). Points 2 and 3 are at the same pressure but differ in solenoid drive current required to produce that pressure. Point 4 is automatically established during transmission operation or factory test by pressurizing the differential spool land 146 of the pressure control apparatus 100 as described below. When chamber 149 is pressurized, apparatus 100 assumes the second characterization position shown in FIG. 7.

Figure 7:
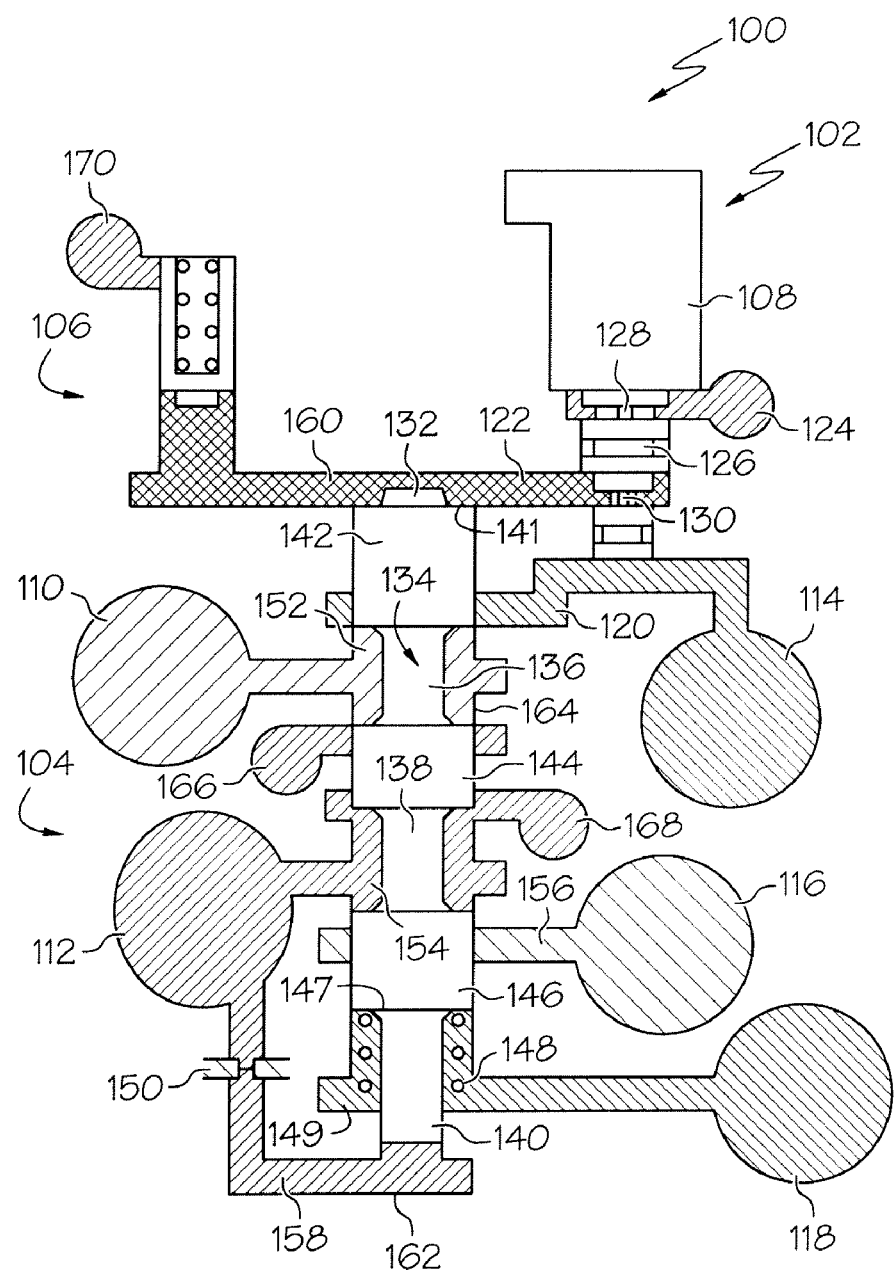
FIG. 7 is a schematic of a pressure control apparatus usable to execute steps of a dual point solenoid pressure control method, shown in a second characterization position.

In the second characterization position of FIG. 7, a known hydraulic pressure 118 is temporarily applied to the chamber 149. As a result, a hydraulic force is added to the existing spring force to more firmly preload the spool valve 104 in the "off" position. Solenoid current is then increased by the controller 32, 60 until solenoid pressure overcomes the total preload. The valve 104 then moves and activates the pressure switch 110 as described above. Thus, a second (upper) point on the solenoid's P/I curve is established by the controller 32, 60 using signals provided by the pressure switch 110. This process is repeated for each clutch control solenoid in the transmission and is also repeated at multiple temperatures.

In a dual point system as described herein, the current offset routine 74 uses the measured difference between the reference current (pre-programmed into the controller) and the actual measured current performance point for both the upper and lower calibration pressures to customize the reference P/I curve for each individual solenoid.

For example, if the microprocessor 60 is requesting the point 2 pressure (same pressure as point 3) or lower, the full lower point offset is added to or subtracted from the point 2 current. If microprocessor 60 requests a pressure above the point 1 pressure (same pressure as point 4), the upper point offset is added to or subtracted from the reference P/I curve at points above point 1. If microprocessor 60 requests any pressure in the range between points 1 and 2, the offset is applied proportionally or "prorated" along that portion of the reference P/I curve.

As noted above, data for each pair (i.e., upper and lower) performance points are determined at the same solenoid temperature. Data for all reference points are set for all temperatures during transmission development. Additional controller software may be provided, and/or the P/I data structure(s) may be customized, to gather and manage additional pairs of calibration points (at the same two pressures) for each clutch control solenoid at other temperatures. This data may be used to customize the reference temperature data. This is likely to further improve transmission performance.

The dual point control method provides the ability to measure a second solenoid performance point in real time, on-board the transmission control module, and therefore enables lower cost solenoids to be used for clutch control in a vehicle transmission. It also may improve the accuracy of the controller's temperature compensation tables.

The third method, like the other methods, may be used to improve shift quality during manufacture or factory test or first time customer use of the transmission, to thereby increase customer satisfaction. The third method, referred to herein as the "modified single point" method, may be executed by routine 66 alternatively or in addition to either or both of the first and second methods described above. Unlike the first and second methods, the third method does not require stipulation of an upper reference point. Further, unlike the first method, the third method does not require the individual solenoid P/I curves to intersect the reference P/I curve at any point. In fact, the third method is directed to situations where the individual solenoid P/I curves do not intersect the reference P/I curve. As such, the third method may be particularly useful to adjust the P/I curves for individual solenoids where the solenoids have a substantially consistent curve shape or slope angle relative to the reference P/I curve.

According to the third method, a performance point (point 1 of FIG. 8) is determined using pressure control apparatus 100, and then the offset between the performance point and the reference point is determined. The performance point is determined in the same manner as the lower point of the first and second methods disclosed above. The third method only compares the actual current to the reference current at the lower point. The reference pressure is near the lower end of the critical operating range of the solenoid. In the illustrated embodiment, the critical solenoid pressure range is in the range of about 90-450 kPa and the reference pressure is represented by points 1 and 2 of FIG. 8.

A gradually increasing solenoid accuracy tolerance band is specified starting at the reference pressure and extending to the upper end of the operating pressure range. The beginning of this tolerance band is located at the current that is actually required to produce the reference pressure as long as that current falls within the specified current range. This current is illustrated as point 1 in FIG. 8. The critical pressure range is illustrated by the bracketed area of FIG. 8. In other embodiments, additional accuracy tolerance may be permitted beyond the critical operating range.

The offset between the actual and target current (i.e., the difference between the current recommended by the pre-selected P/I look-up table for the target pressure and the measured current actually required to achieve the target pressure) is calculated and applied to provide unique current offsets for each individual pressure control solenoid.

Figure 8:
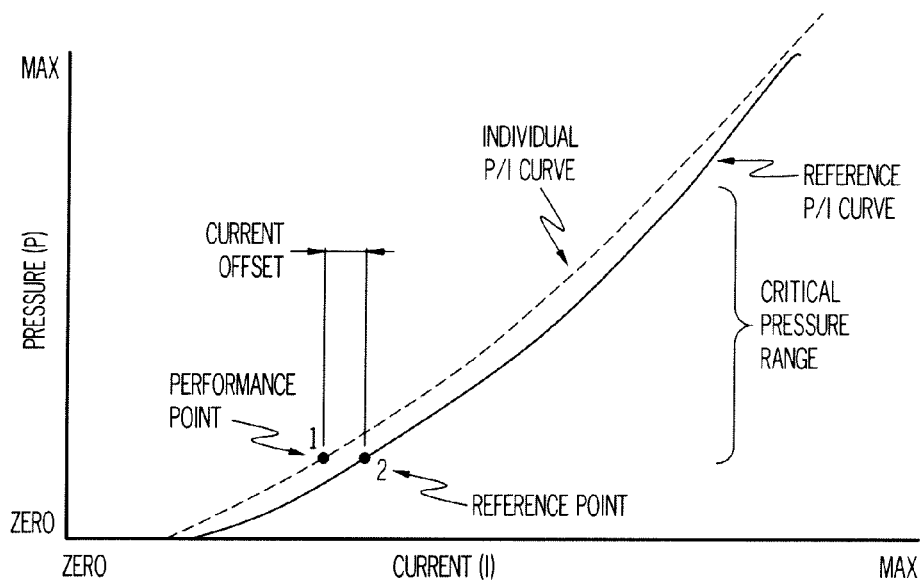
FIG. 8 is a graph illustrating aspects of a third, "modified single point" pressure control method.

In the illustrated embodiment of the third method, point 1 of FIG. 8 is a pressure point on a typical solenoid's P/I curve. The solenoid specifications are set to require that the reference pressure is produced within the allowable current range at the specified calibration temperature. Rather than pre-selecting a high calibration point as in method 1, in method 3 the reference pressure is selected to match the solenoid output pressure at which the spool valve 104 toggles the pressure switch 110 of FIGS. 12-14 described below. This target pressure is near the transmission's critical clutch control pressure range.

Point 2 of FIG. 8 is the pressure point on the reference P/I curve (solid line) stored in the memory of the transmission controller. Typically, individual solenoid P/I curves will pass either to the left or right of this point as a result of solenoid manufacturing variation. The dashed line represents the curve of one such solenoid.

Figure 12:
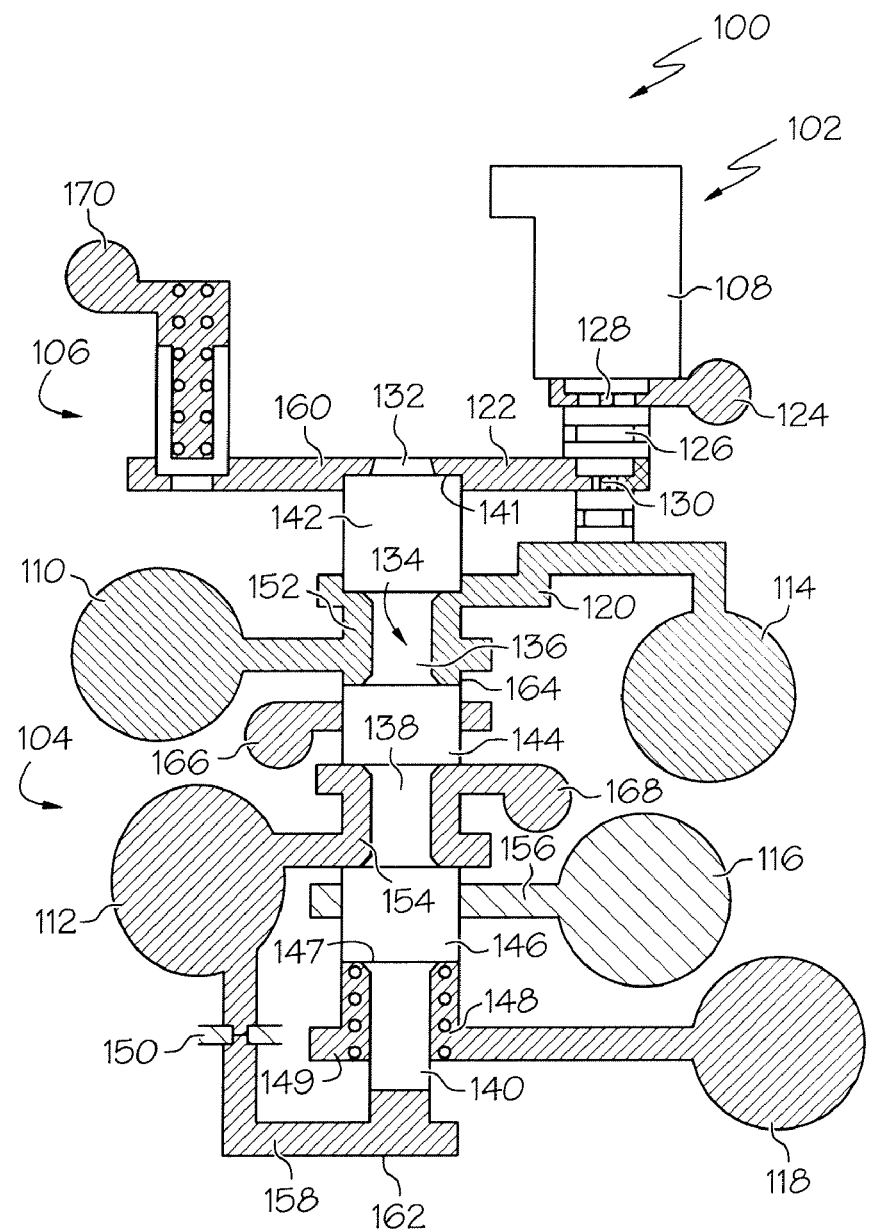
FIG. 12 is a schematic of a pressure control apparatus usable to execute steps of the third pressure control method; shown in an "off" position.
Figure 13:
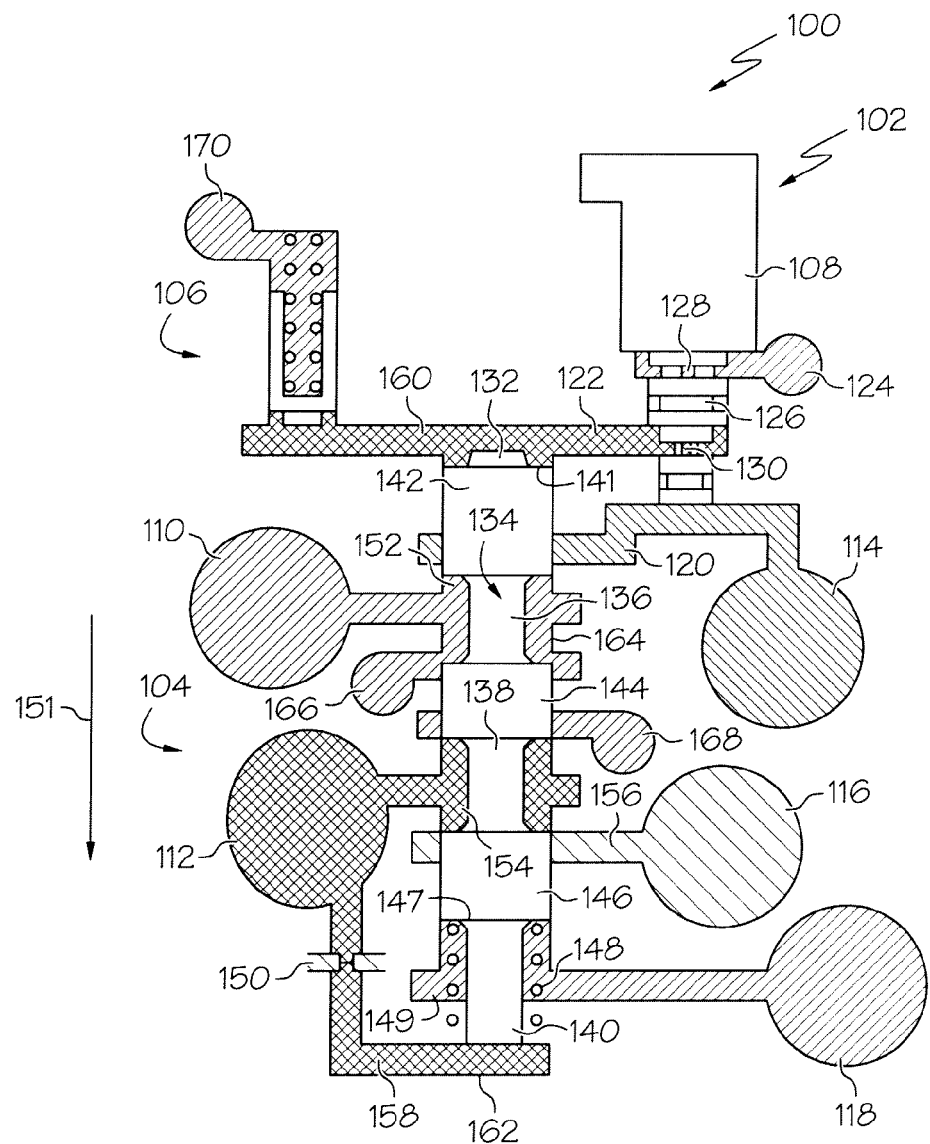
FIG. 13 is a schematic of the pressure control apparatus of FIG. 12, shown in a "trim" position.
Figure 14:
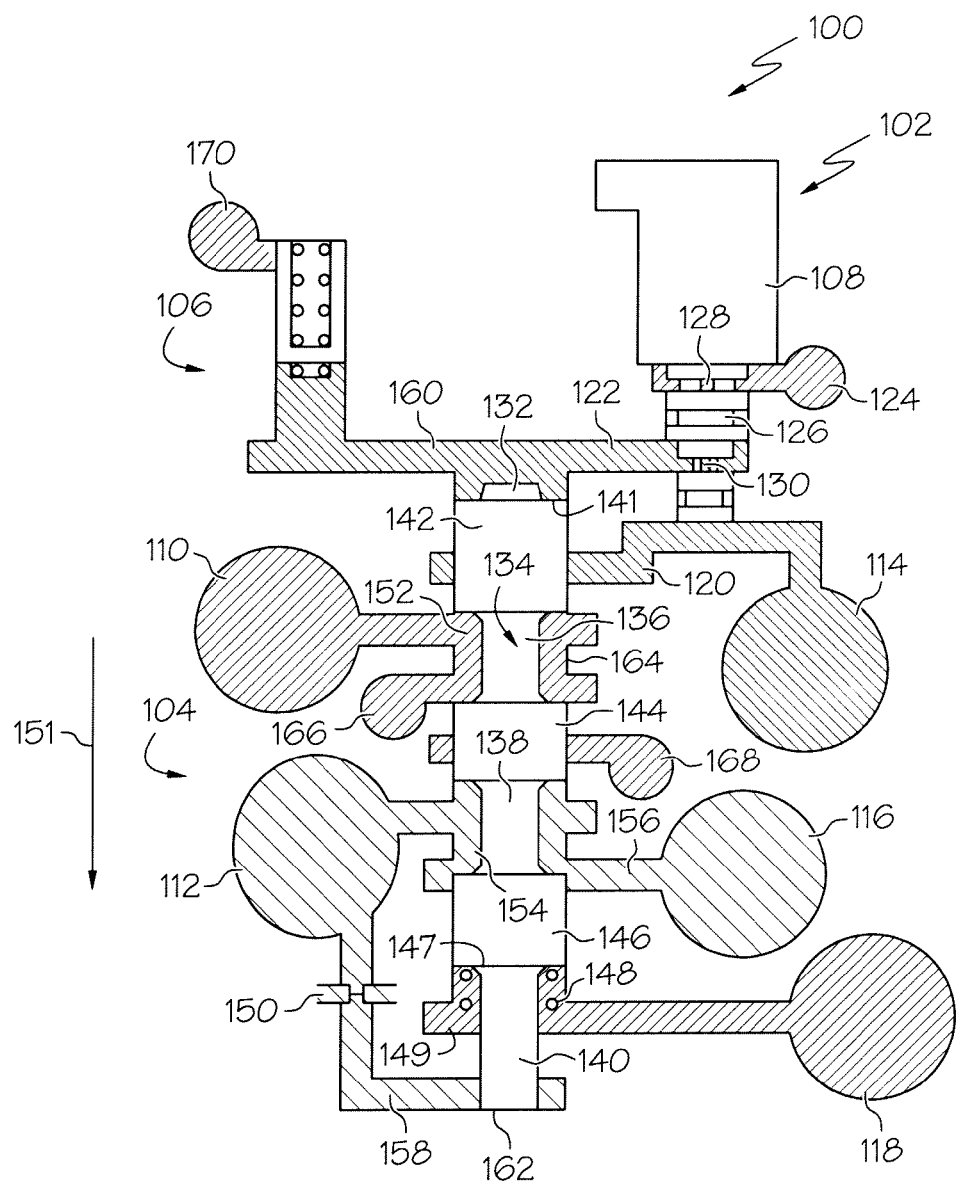
FIG. 14 is a schematic of the pressure control apparatus of FIG. 12, shown in an "on" position.

The pressure switch 110 of FIGS. 12-14 is activated at a predetermined solenoid pressure by designing the spool valve 104 and the return spring 148 to prevent spool movement until the desired solenoid pressure is reached. Porting of the spool valve 104 applies control pressure to the switch 110 until solenoid pressure lifts the spool 134 from its mechanical stop. When the switch 110 toggles, the transmission controller 32, 60 is signaled to record the unique solenoid current required to achieve the target pressure. This process may be repeated for each pressure control solenoid in the transmission 14 and may be repeated at different temperatures.

Routine 66 uses the measured difference between the reference current (point 2 of FIG. 8, pre-programmed into the controller) and the actual current performance point (point 1) to offset the reference P/I curve (i.e., the preprogrammed lookup table) to closely duplicate the shape of the individual solenoid P/I curve of point 1 (dashed line of FIG. 8) at a new location along the "x" axis as needed. In other words, the current offset established as described above is applied equally at all pressures in the operating range.

As with the other methods, performance points are determined at the same solenoid temperature as reference points, which are generally set during the solenoid development for all temperatures in the operating range. Temperature compensation for the solenoid is provided by the temperature compensation routine 72 of FIG. 2, described above. The current offsets described herein may be applied equally at all transmission operating temperatures, or new offsets may be established at other temperatures. With all of the disclosed methods, additional curve offsets may be implemented by using existing adaptive algorithms to further improve system performance.

Figure 9:
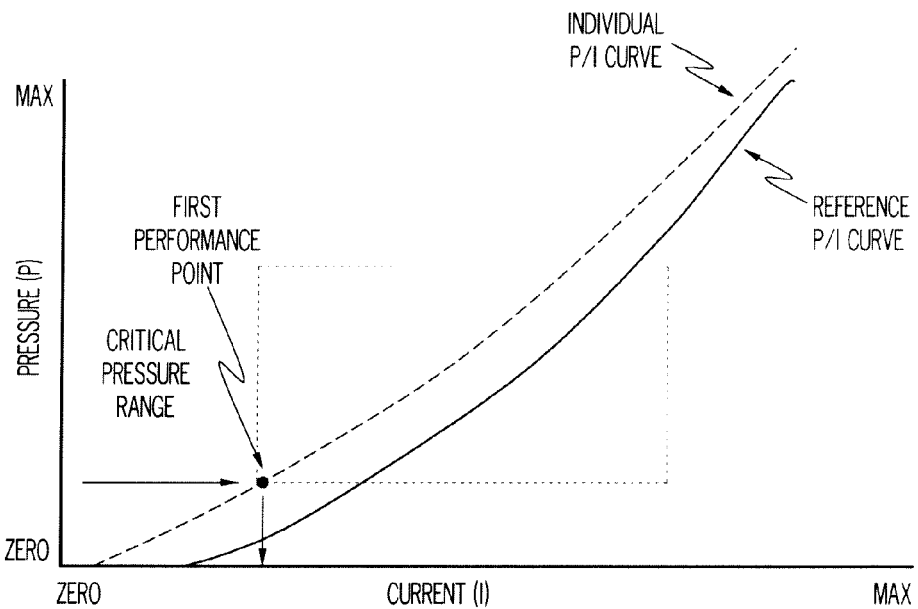
FIGS. 9-11 are graphs illustrating individual steps of the second pressure control method.
Figure 10:
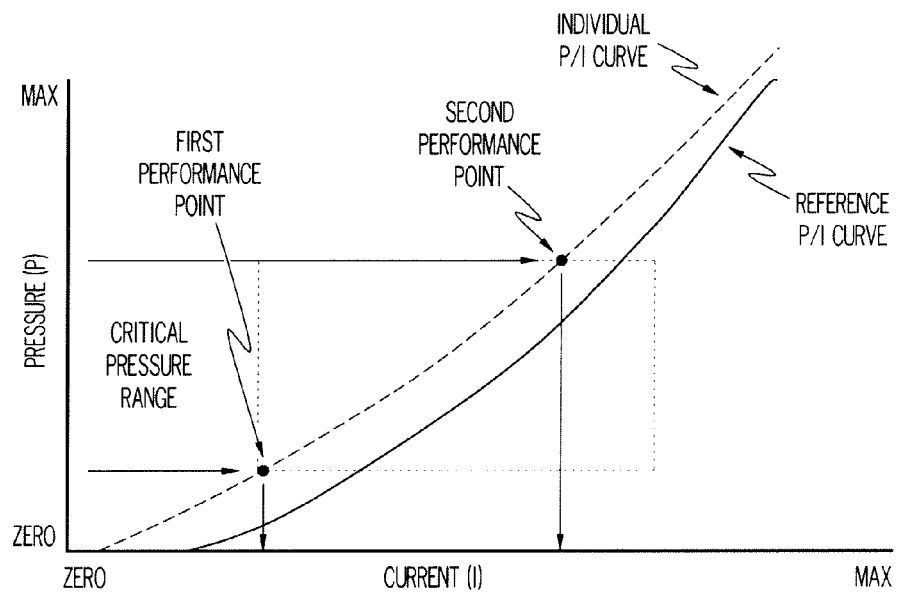
Figure 11:
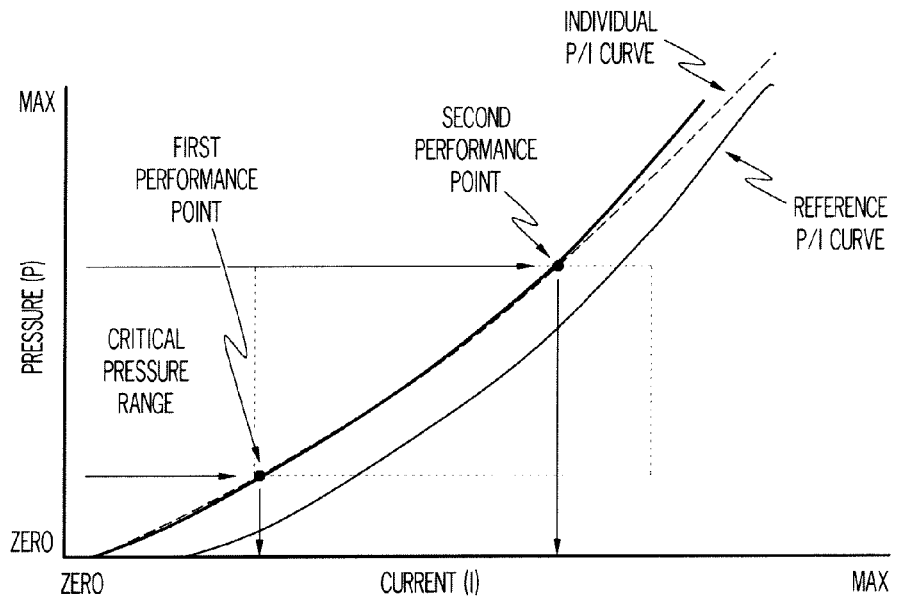

FIGS. 9, 10 and 11 illustrate the three steps of the second, dual point, method, usable in situations where the individual solenoid P/I curves do not intersect the reference P/I curve (and therefore have a substantially consistent slope relative to the reference P/I curve).

FIG. 9 illustrates the step of identifying the first performance point. The first performance point is located near the lower end of the operating range and is determined by the controller 60 and the pressure control apparatus 100 executing the steps of the third method, described above. FIG. 10 illustrates the step of identifying the second performance point, which is located near the upper end of the operating range. The second performance point is identified by the controller 60 and the pressure control apparatus 100 preloading the land 146 with control main pressure according to the second method as described above. An offset is determined by comparing the performance points to the location of the reference P/I curve. The solenoid's reference P/I curve is then modified as shown by FIG. 11, by shifting or proportionally offsetting the curve along the x axis, in either direction as needed, by the amount of the offset.

The structure of pressure control apparatus 100 will now be described. It will be understood by those skilled in the art that other similar suitable structures may be employed to perform the steps of the methods described herein. FIG. 6 illustrates the pressure control apparatus 100 configured for measuring the lower point of all of the above-described methods. FIG. 7 illustrates the pressure control apparatus 100 configured for measurement of the upper performance point of the second (dual point) calibration methods.

FIGS. 12-14 illustrate the pressure control apparatus 100 configured for other control functions which may be performed during transmission clutch control.

Pressure control apparatus 100 is similar to a pressure control apparatus described in U.S. Pat. No. 6,382,248 to Long, et al. Apparatus 100 includes a solenoid valve 102, a pressure regulator valve 104 and a diagnostic pressure switch 110. The solenoid valve 102 is coupled to the pressure regulator valve 104, which in turn, is coupled to the pressure switch 110 and a transmission clutch (or friction element or other load to be controlled) 112.

A hydraulic accumulator 106 for hydraulically filtering step changes in the output pressure of solenoid valve 102 is also shown, however, the inclusion of accumulator 106 is considered optional.

Control module 32, 60 develops a control signal 50 for activating the solenoid valve 102, and receives a diagnostic input from switch 110 via appropriate electrical connections (such as insulated wiring). The solenoid valve 102 includes a coil 108. The control signal 50 issued by module 32, 60 is configured to produce a desired fluid pressure in clutch 112. A control pressure source 114 and a line pressure source 116 are in fluid communication with conventional fluid supply elements such as a pump and suitable pressure regulator valves, as indicated schematically in FIG. 1. The line pressure may have a value in the range of about 150-300 pounds per square inch (psi), and the control pressure is regulated to a lower value, such as a lower value in the range of about 100 psi.

The solenoid valve 102 is coupled to supply passage 122, exhaust passage 124 and feed passage 120. Valve 102 includes a fixed housing 126 having a pair of ports 128 and 130. An armature is movably disposed within the housing 126. The spool port 130 is in fluid communication with passage 122. Port 130 is also couplable to control pressure feed passage 120.

Port 128 is coupled to an exhaust passage 124. The armature selectively couples the ports 128 and 130 to variably exhaust the fluid pressure in pilot pressure passage 122. In certain embodiments, an internal spring mechanism may bias the armature to a position which couples spool ports 128 and 130 so that fluid pressure in passage 122 is exhausted at zero current (a "normally low" solenoid). In other embodiments, where a normally high solenoid is used, the fluid pressure is exhausted at high current.

Solenoid coil 108 may be actuated or energized by electrical input, i.e. current, issued by a controller 32, 60. In the illustrated embodiment, the solenoid input is a controlled direct current. Activation of the solenoid coil 108 produces an electromagnetic force that overcomes a bias, and moves the armature to un-couple the spool ports 128 and 130. In the illustrated embodiment, activation of the coil 108 by control 32, 60 results in a modulated pressure in passage 122. In other embodiments, deactivation of the coil 108 modulates pressure in passage 122. Aspects of the present invention are configurable to be used with normally high or normally low solenoids, as noted above.

The pressure regulator valve 104 has a spool element 134 as mentioned above. Spool element 134 has subsections 136, 138, 140 that are separated by lands 142, 144, 146, which are spaced apart along the longitudinal axis of spool 134. Lands 142, 144, 146 extend radially outward from spool 134 to selectively engage portions of a valve bore or chamber 164. As such, land 142, spool subsection 136 and land 144 cooperate to define valve a subchamber 152. Likewise, land 144, spool subsection 138 and land 146 cooperate to define a valve subchamber 154.

Spool element 134 is axially movable within the valve bore 164 under the influence of return spring 148, which is disposed in a valve subchamber 149 adjacent to spool subsection 140, a pilot pressure applied to a pressure control area 141 of land 142, and a feedback pressure applied to a pressure control area 147 of land 146.

FIG. 6 depicts the first characterization position of apparatus 100, which is used to obtain the lower end performance point used in each of the three methods described above. In FIG. 6, solenoid 102 is actuated, so that fluid ports 128, 130 are at least partially disconnected and at least partial fluid pressure is applied to valve head 132 via passage 122. Pressure switch 110 is in fluid communication with valve subchamber 152 and thereby measures the output pressure of valve 104 corresponding to the electrical input applied to solenoid 102. The electrical input to solenoid 102 is increased until switch 110 actuates indicating that the reference output pressure is obtained at the lower end performance point. The resulting current value specifies point 3 of methods 1 and 2 described above.

In the various figures, the different shading of fluid filled regions of apparatus 100 denotes differences in fluid pressures. In FIG. 6, fluid in chambers 124, 168, 118, 112, 166 and 170 are at the same pressure, namely, the exhaust pressure. The exhaust pressure is in the range of about 0 psi. Also in FIG. 6, fluid in chambers 114, 120 is at the control pressure, fluid in chambers 116, 156 is at the line pressure, and fluid in chambers 110, 152 is at the output pressure measured by switch 110. Fluid in passage 122 is at a trim pressure, which generally varies in the range of about 0-110 psi.

To obtain point 4 of FIG. 5, the upper pressure value, of the second method (dual calibration) described above, a second characterization position of apparatus 100 is used. In the second characterization position, shown by FIG. 7, control pressure is applied to area 147 of land 146, further counteracting the fluid pressure applied to valve head 132 by passage 122. As such, a greater trim pressure is required to downwardly displace spool 134 relative to the valve chamber 164, and therefore, a greater amount of current be applied to solenoid 102 without moving the spool 134. The current applied to solenoid 102 is increased until the second performance point (the upper calibration point) is detected by switch 110. This current value specifies point 4 of the dual calibration method described above. Note that the higher pressure also results in axial displacement of accumulator 106.

As noted above, the different shading of fluid filled regions of apparatus 100 denotes differences in fluid pressures. In FIG. 7, fluid in chambers 124, 168, 112, 166 and 170 are at the same pressure, namely, the exhaust pressure. Also in FIG. 7, fluid in chambers 114, 118, 120 and 149 is at the control pressure, fluid in chambers 116, 156 is at the line pressure, and fluid in chambers 110, 152 is at the output pressure measured by switch 110. Fluid in passage 122 is at a trim pressure, which generally varies in the range of about 0-110 psi but is higher in the characterization of FIG. 7 than the trim pressure in FIG. 6.

The spool element 134 may also actuated to one of three states under the control of solenoid valve 102, the various states being individually depicted by FIGS. 12, 13 and 14 during clutch control in an automatic transmission of a motor vehicle.

FIG. 12 depicts a rest or "off" state of the spool element 134 that occurs when the solenoid coil 108 is deactivated, exhausting the fluid pressure in pilot pressure passage 122 via exhaust passage 124. In such state, the return spring 148 biases spool element 134 upward, bringing valve head 132 into engagement with passage 122. The pressure switch 110, which is coupled to the fluid chamber 152 between lands 142 and 144, simply detects the control pressure since the fluid chamber 152 is in fluid communication with control pressure 114. The clutch or other friction element 112, which is coupled to the fluid chamber 154 between lands 144 and 146, is exhausted via exhaust passage 168. In the "off" state, the control 32, 60 is not performing any of the self-calibrating methods, and thus the pressure switch 110 is deactivated, because the clutch being controlled by the solenoid is fully disengaged.

FIG. 13 depicts a clutch trim state of chamber 154 of valve 104, which occurs when the solenoid coil 108 is actuated. A trim pressure in passage 122 acts on valve head 132 to partially compress the return spring 148. Such pressure also partially strokes the accumulator 106, as shown. In such state, the spool element 134 moves downwardly in the valve chamber (in the direction of arrow 151) and land 144 decouples the fluid chamber 154 from exhaust 168. This builds fluid pressure in friction element 112, creating a feedback pressure in passage 158, which is coupled to friction clutch 112 via restriction or orifice 150.

The force created by the feedback pressure assists the force created by return spring 148, and the spool element 134 dithers to alternately couple and decouple the fluid chamber 154 to and from exhaust passage 168, thereby regulating the fluid pressure delivered to friction element 112 to a level that is proportional to the pressure in passage 122. This regulation of pressure to the clutch 112 is configured to smoothly engage or disengage the clutch. When the clutch 112 is trimming, land 144 unblocks exhaust 166 and connects pressure switch 110 to exhaust 165 via chamber 152. This change in pressure from control pressure to exhaust pressure is detected by pressure switch 110, and the pressure switch reports the pressure change to control 32, 60 as described above. The actual current at the time of the switch actuation is captured and used by each of the methods as described above.

FIG. 14 depicts an "on" state of the spool element 134 that occurs when solenoid coil 108 is actuated at a very high current for normally low solenoids. For normally high solenoids, coil 108 is actuated by very low or zero current. In either case, actuation of coil 108 produces sufficient fluid pressure to cause spool 134 to move further downwardly (in the direction of arrow 151). Port 130 connects with control pressure 114, 120, resulting in control pressure being applied to passage 122 to overcome the feedback pressure and fully compress the return spring 148. When spring 148 is fully compressed, spool member 140 comes into engagement with passage 158 at an end of travel position 162. Such pressure also fully strokes the accumulator 106, as shown. In such state, land 146 fully uncovers the line pressure passage 156, thereby supplying clutch or friction element 112 with the full line pressure. Application of the line pressure to clutch 112 engages or applies the clutch.

When the clutch or friction element is to be disengaged, the above-described process is reversed by reducing the electrical input of solenoid coil 108, first to an intermediate range of electrical inputs to establish trim control, and then deactivating solenoid coil 108 to return to the rest or off state.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A method, comprising:
receiving at least one reference output pressure value associated with a clutch control apparatus,
receiving at least one reference electrical input value related to the at least one reference output pressure value,
determining an actual electrical input value corresponding to the reference output pressure value,
calculating at least one offset between the reference electrical input and the actual electrical input, and
applying the at least one offset to the at least one reference electrical input value.

2. The method of claim 1, comprising selectively applying the at least one offset to the at least one reference electrical input value.

3. The method of claim 2, comprising determining whether to apply the at least one offset based on a requested output pressure.

4. The method of claim 2, comprising applying the at least one offset in proportion to the requested output pressure if the requested output pressure is greater than or equal to a first pressure value and less than or equal to a second pressure value.

5. The method of claim 1, comprising selectively applying no offset to the at least one reference electrical input value.

6. The method of claim 1, comprising selecting a method of calculating the at least one offset from a plurality of methods of calculating an offset.

7. The method of claim 6, wherein the plurality of methods includes a method in which a first reference output pressure value is a pre-specified calibration point at which the offset is zero.

8. The method of claim 6, wherein the plurality of methods includes a method in which a first reference output pressure value is a first pre-specified calibration point at which the offset is not zero.

9. The method of claim 6, wherein the plurality of methods includes a method in which a first reference output pressure value is a first pre-specified calibration point at which the offset is not zero and a second reference output pressure value is a second pre-specified calibration point at which the offset is not zero.

10. The method of claim 1, comprising determining at least one characteristic of the clutch control apparatus and selecting a method of calculating the offset based on the characteristic of the clutch control apparatus.

11. The method of claim 10, comprising executing a calibration routine to determine the at least one characteristic of the clutch control apparatus.

12. The method of claim 1, comprising determining at least one operating temperature of the clutch control apparatus and determining the at least one offset based on the at least one operating temperature.

13. The method of claim 1, comprising calculating a plurality of offsets and selectively applying the plurality of offsets to a plurality of reference electrical input values.

14. A transmission control system embodied in a vehicle, the transmission control system comprising a routine configured to execute the method of claim 1 during normal or factory-test operation of the vehicle.

15. A system comprising a routine configured to execute the method of claim 1 during manufacture or assembly of the clutch control apparatus.

* * * * *